United States Patent [19]

Wolf

[11] Patent Number: 4,644,847
[45] Date of Patent: Feb. 24, 1987

[54] REDUCTION OF FAILURE INCIDENCE OF METALLIC DIAPHRAGMS FOR COMPRESSORS

[75] Inventor: Robert C. Wolf, Langhorne, Pa.

[73] Assignee: Fluitron, Inc., Ivyland, Pa.

[21] Appl. No.: 626,411

[22] Filed: Jun. 29, 1984

Related U.S. Application Data

[63] Continuation-in-part of Ser. No. 495,101, May 16, 1983, abandoned.

[51] Int. Cl.⁴ ............................................. F15B 21/04
[52] U.S. Cl. .......................................... 92/78; 92/87; 92/98 R; 92/104
[58] Field of Search ...................... 92/87, 96, 97, 98 R, 92/98 D, 99, 100, 101, 102, 103 R, 103 F, 103 M, 104, 78; 417/395, 413; 137/312, 544, 545; 251/331

[56] References Cited

U.S. PATENT DOCUMENTS

| | | | |
|---|---|---|---|
| 1,712,657 | 5/1929 | Frankenberg | 92/101 |
| 2,839,087 | 6/1958 | Ochsner | 92/98 R |
| 3,307,403 | 3/1967 | Bernett | 92/98 R |
| 3,416,461 | 12/1968 | McFarland | 92/98 R |
| 3,668,978 | 6/1972 | Bowen | 92/98 |
| 4,022,114 | 5/1977 | Hansen et al. | 92/98 R |
| 4,304,260 | 12/1981 | Turner et al. | 251/331 X |

FOREIGN PATENT DOCUMENTS 527556 6/1977 U.S.S.R. .................................. 92/78

Primary Examiner—Robert E. Garrett
Assistant Examiner—Mark A. Williamson
Attorney, Agent, or Firm—Z. T. Wobensmith, III

[57] ABSTRACT

In a compressor which includes an upper and lower head portions and an interposed diaphragm, provisions are made for increasing the service life of the diaphragm by reducing the incidence failure of the diaphragm due to fretting products and airborne contaminants, which collect at the outer edge of the diaphragm which results in stress concentrations at the outer edge of the diaphragm, and specifically by providing a plurality of concentric grooves in the upper head of the compressor to remove the fretting products and gas borne contaminants from build up at the outer edge of the diaphragm.

5 Claims, 5 Drawing Figures

REDUCTION OF FAILURE INCIDENCE OF METALLIC DIAPHRAGMS FOR COMPRESSORS

CROSS REFERENCE TO RELATED APPLICATIONS

This application is a continuation-in-part of my prior application Ser. No. 495,101, filed May 16, 1983 entitled Prevention Of Failure Of Metallic Diaphragms For Compressors, now abandoned.

BACKGROUND OF THE INVENTION

1. Field of the Invention

This invention relates to metallic diaphragms for compressors, and more particularly to provisions for increasing diaphragm life by reducing the failure incidence arising from the results of fretting and stress concentrations on the surface of the diaphragms.

2. Description of the Prior Art

The use of metallic diaphragms in non-lube diaphragm compressors offers many advantages over the use of elastomeric or plastic diaphragms in that higher pressures can be attained, higher temperatures can be accommodated, and less deformation is experienced. However, metallic diaphragms are more prone to failure from stress concentrations, which may occur due to dirt, chips or accretion of foreign material such as dust or extremely fine particles which become trapped between the diaphragm and the head of the compressor. The outer edge of the diaphragm cavity is the region where the combined stresses of bending moment and diaphragm stress occur, and where most diaphragms fail. Rarely do failures occur towards the center of the diaphragm, even though the movement is largest at the center.

Another phenomenon which appears at the outer edge of the cavity is that of fretting, which is caused by the sliding action of the dry metallic diaphragm against the dry metallic head. Chemical analysis has shown this to be oxide of iron in the case where the materials of construction for the head and/or diaphragm contain iron (such as any of the austenitic stainless steels, i.e. 304, 301, 316, etc.). This oxide slowly builds up to a point where the shape of the cavity is altered, increasing the bending moment which ultimately results in diaphragm failure at the outer edge.

It has also been observed that diaphragm failure occurs in the fretted area due to small particles of metal being "picked" out of the diaphragm. This "picking" action is probably the result of "cold welding" of the diaphragm to the head.

There has been no way yet developed to dramatically reduce or eliminate this fretting action, many solutions have been proposed such as hard facing the mating parts, plating, nitriding, and surface treatments of the heads and diaphragms, to no avail. The problem, of course, is accentuated by the presence of dust in the gas, which even with most careful gas filtration, still builds up over long periods of time.

Frankenberg in U.S. Pat. No. 1,712,657 discloses the use of radial grooves which provide a path for gas to exit from the head, and also discloses using one or more wide concentric stress risers in communication with the radial grooves to also distribute the gas pressure, but does not disclose grooves adjacent the outer edge of the chamber. The use of wide concentric stress risers in a high pressure compressor would result in considerable loss of compressor efficiency due to the dead space provided by the wide concentric stress risers.

Bowen in U.S. Pat. No. 3,668,978 discloses a typical compressor head with diaphragm for high pressure pumps, but contains no provisions for dealing with the problems of fretting and stress concentration.

My invention provides a storage place for the products of the fretting action and normal particles carried by the gas, to be accommodated, thereby reducing failure due to stress concentrations, and greatly extending diaphragm life.

SUMMARY OF THE INVENTION

This invention relates to provisions for reducing the incidence of failure of metallic diaphragms due to fretting action and stress concentrations and more particularly to the providing of concentric grooves on the upper head of the compressor to provide a storage place for the products of the fretting action and particles, thereby reducing stress concentration and preventing failure of the diaphragm.

It is the principal object of the invention to make provisions in the compressor head so as to reduce failure of the diaphragm due to fretting and stress concentrations.

It is a further object of the invention to make provisions aforesaid which is applicable to compressors having flat or curved interior head configurations.

It is a further object of the invention to make provisions aforesaid which are applicable to both high and low pressure compressors.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
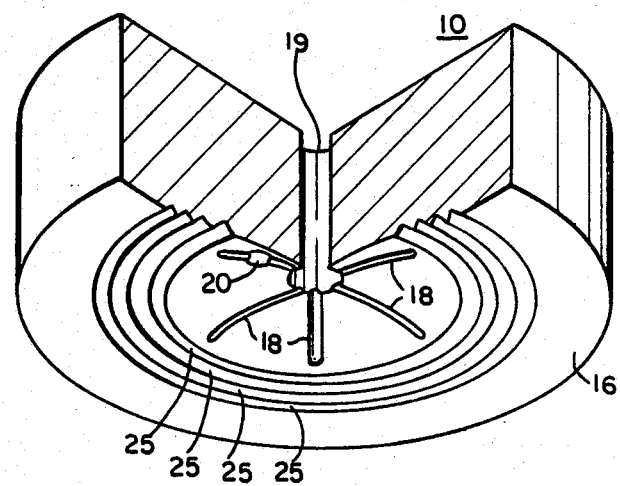
FIG. 1 is a view in perspective of one type of upper head of a compressor incorporating the invention.
Figure 2:
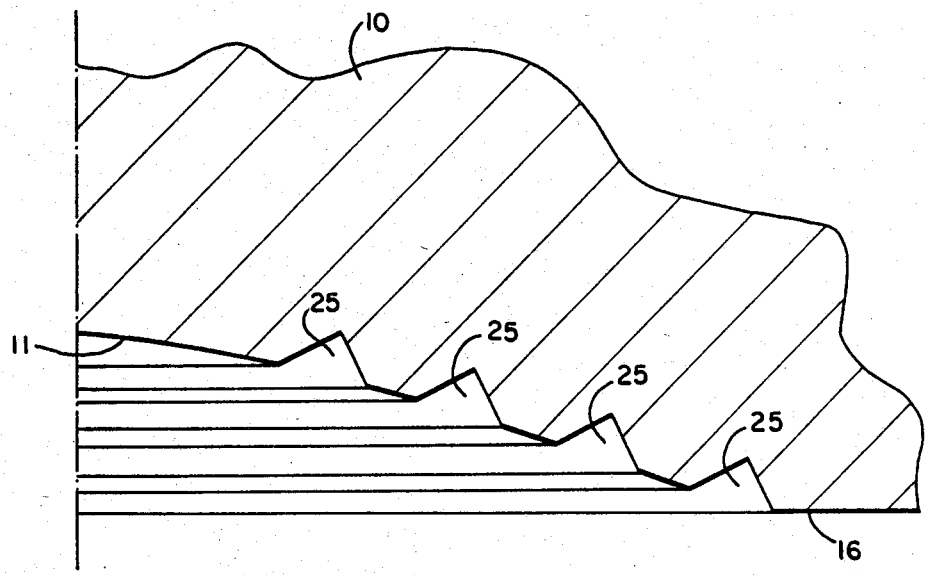
FIG. 2 is a fragmentary sectional view of the upper head of the compressor of FIG. 1.
Figure 3:
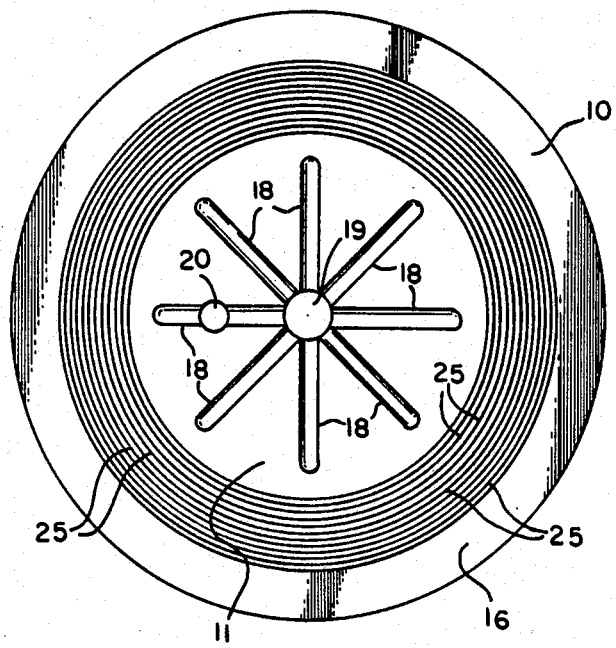
FIG. 3 is a bottom plan view of the upper head of the compressor of FIG. 1.
Figure 4:
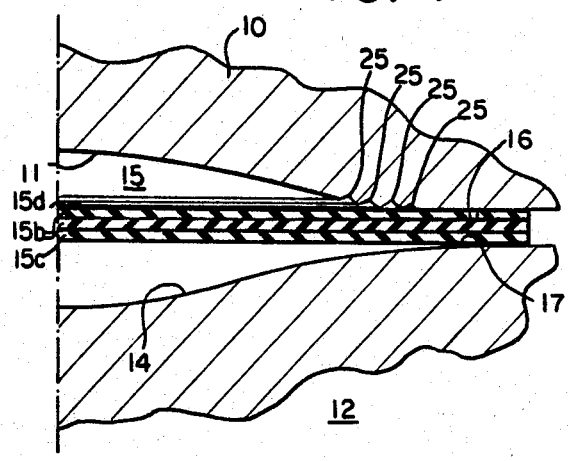
FIG. 4 is a fragmentary transverse sectional view of the upper and lower heads of the compressor of FIG. 1, with a diaghragm interposed therebetween.

Referring now more particularly to the drawings and FIGS. 1 to 4 thereof, a typical compressor head is shown in FIG. 4 which includes an upper portion 10 with a curved interior surface 11, a lower portion 12, with a curved interior surface 14 and which has an interposed diaphragm 15. The diaphragm 15 is illustrated as having a plurality of laminations 15a, 15b and 15c.

The surface 14 provides an oil cavity for the successive application and withdrawal of pressure on the underside of the diaphragm 15, with a rim 16 provided for engagement with the upper face of the diaphragm 15 and a rim 17 provided for engagement with the bottom face of the diaphragm 15.

The interior surface 11 provides a gas cavity, with a plurality of small radial grooves 18 therein which extend to communicate with a discharge hole 19. A suction hole 20 is provided in one of the radial grooves 18.

The diaphragm 15 is preferably a metallic diaphragm which permits of accommodating higher pressures and higher temperatures. The metallic diaphragm 15 is prone to failure from stress concentrations, which may occur due to dirt, chips or particles or accretion of foreign material such as dust or extremely fine particles which tend to collect at the outer edge of the diaphragm cavities. This is the region where the combined stresses of bending moment and diaphragm stress occurs and where most diaphragms fail.

One of the producers of this foreign material is fretting, which occurs at the outer edge of the cavities and is caused by the sliding action of the dry metallic diaphragm 15 against the dry metallic head portion 10. Chemical analysis has shown this foreign material is an oxide of iron, where the materials of constructions for the head portion 10 and the diaphragm 15 contain iron, such as austenitic stainless steels. The foreign material slowly builds up to a point where the shape of the cavity or head portion 10 is altered, which increases bending moment, which ultimately results in failure of the diaphragm 15 near its outer edge.

Another producer of foreign material in the fretted area is due to small particles of metal being picked out of the diaphragm 15. This picking action is probably the result of cold welding of the diaphragm 15 to the head portion 10, and in addition the foreign particles collect near the cavity edge and increase the stress on the diaphragm shortening its life and causing premature failure.

While many solutions have been proposed to reduce the fretting action, such as hard facing the mating parts, plating, nitriding, surface treatments of the head portion 10 and the diaphragm 15, none offers an acceptable solution. The problem, of course, is accentuated by the presence of contaminants such as dust in the gas which even with the most careful gas filtration builds up over long periods of time.

A solution for the problem is to provide a storage place for the products of this fretting action, i.e. the iron oxides and dust and other foreign materials to go where they will cause no further trouble. A series of small circumferential grooves 25, shown as four in number, is provided in portion 10 as shown in FIGS. 1, 2, 3 and 4, for the collection of the iron oxides and the dust.

The grooves 25 may be V-shaped in the preferred embodiment or of a modified V-shape, with an included angle in the range from ten (10) degrees to one hundred (100) degrees, of a width of from one thousandth (0.001) to fifteen thousandths (0.015) of an inch, of a depth of one thousandth (0.001) to thirty-five thousandths (0.035) of an inch, and with their apices spaced apart in the range from five thousandths (0.005) to thirty thousandths (0.030) of an inch, for high pressure machines in the range from five thousand (5,000) to forty-five thousand (45,000) pounds per square inch. The invention is equally applicable to low pressure compressors in the pressure range from one hundred (100) to one thousand (1,000) pounds per square inch (not shown). In the low pressure embodiment the grooves can also be V-shaped with an included angle in the range from ten (10) degrees to one hundred (100) degrees, of a width of from ten thousandths (0.010) to thirty thousandths (0.030) of an inch, of a depth of from one thousandth (0.001) to thirty-five thousandths (0.035) of an inch, with the apices spaced apart in the range from fifteen thousandths (0.015) to fifty thousandths (0.050) of an inch.

Figure 5:
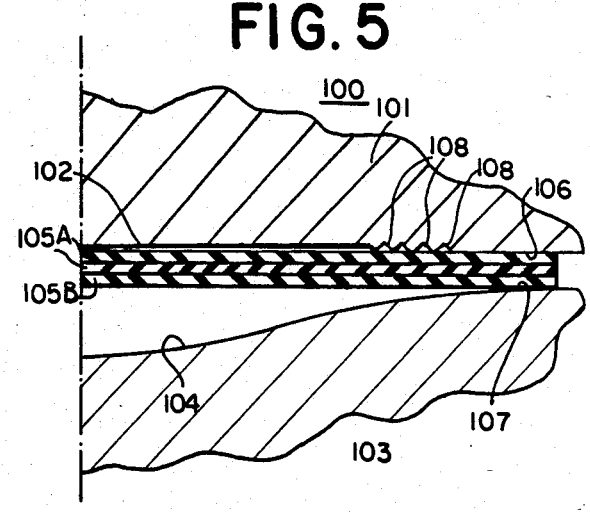
FIG. 5 is a view simiar to FIG. 4 showing another type of compressor head.

Referring now more particularly to FIG. 5, another embodiment of compressor is illustrated with a head 100, which has an upper portion 101, with flat interior surface 102, a lower portion 103, with a curved interior surface 104, and interposed diaphragms 105, 105A, and 105B. A rim 106 is provided to engage the upper face of diaphragm 105, and a rim 107 to engage the bottom face of diaphragm 105B.

A plurality of small circumferential grooves 108 are provided, similar to grooves 25 and which provide a storage place for the products of the fretting action and other particles to go without affecting the operation of the compressor, and which results in lengthening the life of the diaphragm 105.

It will thus be seen that structure has been provided with which the objects of the invention are achieved.

I claim:

1. In a compressor which has upper and lower head portions with an interposed metallic diaphragm, the interior configuration of said upper head providing a gas cavity, said upper head portion having a suction hole and a discharge hole, the improvement which comprises apparatus for increasing the service life of the diaphragm by reducing the incidence of failure of the diaphragm due to build up of fretting products and other foreign particles such as dust and gas borne contaminants and the resultant stress concentrations wherein said upper head portion is provided with a plurality of circumferential grooves therein in communication with said gas cavity for the collection of fretting products and other foreign particles;

said grooves are V-shaped with an included angle in the range from ten degrees to one hundred degrees;

said grooves are of a depth of the order of one to thirty thousandths of an inch; and said grooves have their apices spaced apart of the order of five to fifty thousandths of an inch.

2. Apparatus as defined in claim 1 in which
said grooves are of a width of the order of one to thirty thousandths of an inch.

3. Apparatus as defined in claim 1 in which
said upper head portion has a flat interior surface.

4. Apparatus as defined in claim 1 in which
said upper head portion has a dished interior surface.

5. Apparatus as defined in claim 1 in which
said diaphragm is composed of a plurality of laminations.

* * * * *